Oct. 21, 1969 J. P. SUMMERS 3,474,455
CONTROL UNIT FOR A PLURAL TAPE RECORDING SYSTEM
Filed July 17, 1967
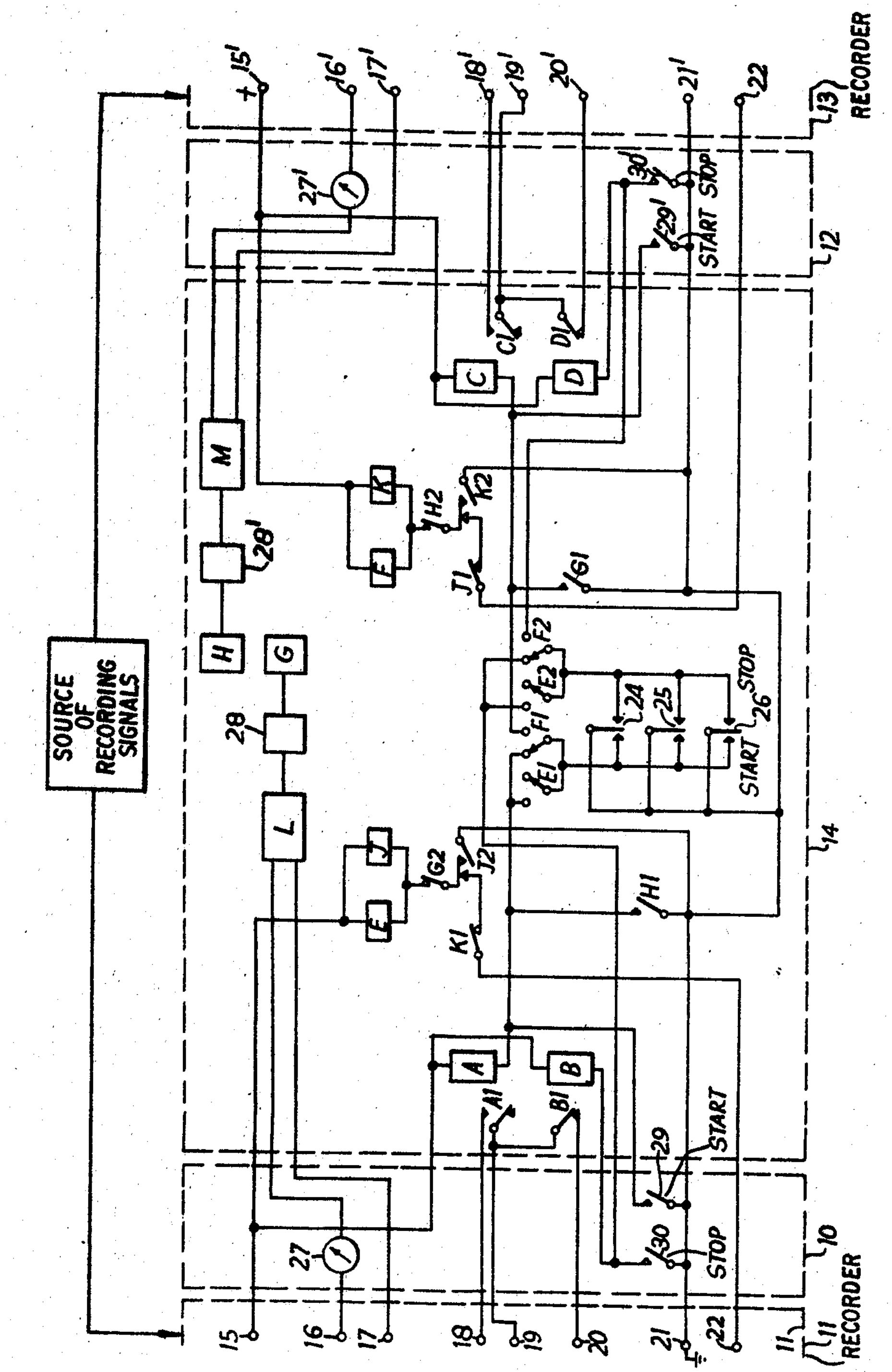
Inventor:
Jack P. Summers
By Kemon, Palmer, Stewart & Estabrook
Attorneys

United States Patent Office 3,474,455

Patented Oct. 21, 1969

3,474,455

CONTROL UNIT FOR A PLURAL TAPE RECORDING SYSTEM

Jack Philip Summers, Kenton, Harrow, England, assignor to G. & E. Bradley Limited, London, England Filed July 17, 1967, Ser. No. 653,773
Claims priority, application Great Britain, July 19, 1966, 32,332/66
Int. Cl. G11b *15/18;* G01d *9/04*
U.S. Cl. 346—44 11 Claims

ABSTRACT OF THE DISCLOSURE

A remote control unit for a tape recording system with two recorders is described. The control unit controls starting and stopping recording by the system and is connected to the recorders by selection means which normally cause one recorder only to record and respond to the control unit. When almost all the tape for one recorder has been used, the remote control unit changes over to the other recorder.

The present invention relates to, remote control apparatus for use with a tape recording system of the type hereinafter specified, and to the system itself. The system specified includes first and second tape recorders, first and second tape-indicating means associated with the recorders, respectively, and means for passing signals to be recorded to both recorders.

If an operator is selecting parts of signals to be recorded by operating a switch which starts and stops recording by a tape recorder, it is sometimes inconvenient for him to stop this activity to switch over from recording on one tape recorder to another, when the first recorder has nearly used up all its tape.

According to the present invention therefore there is provided remote control apparatus, for use with a tape recording system of the type specified, including control means for starting and stopping recording by the system, selection means for rendering the control means effective to control recording by either of the recorders, means for determining which recorder is to record initially under the control of the control means, and first and second sensing means adapted to be coupled to the first and second tape-indicating means respectively, for sensing when a predetermined amount only of unused tape is left for the associated recorder, the selection means being coupled to the first and second sensing means to render the control means effective to control the recorder, not already so controlled when the other recorder has the predetermined amount only of unused tape left.

Since either recorder can be initially selected, it will be seen that, when the initially-selected recorder has been reloaded with tape and the unused tape of the other recorder falls to the predetermined amount, the sensing means of the other recorder will cause start-stop recording control to be switched back to the initially selected recorder.

The remote control apparatus may include change-over means coupled to the first and second sensing means and adapted to be coupled to the two recorders to start recording when the predetermined amount only of unused tape is left for the said one recorder.

When a remote control apparatus according to the invention includes the change-over means, the operator can concentrate on selecting what signals are to be recorded without having to change-over from one recorder to another.

The invention will now be described, by way of example, with reference to the accompanying drawing which is a block diagram of part of a recording system using remote control apparatus according to the invention.

A remote control unit 10 for a multi-track tape recorder 11 is used to switch the recorder to start and stop recording. Another remote control-unit 12 controls a similar tape recorder 13 in the same way. The units 10 and 12 are connected to remote-control apparatus 14 which controls the starting and stopping of recording by both recorders, and also switches one recorder to record when the other recorder runs short of tape.

The recorders 11 and 13 are Ampex AR 200 recorders and are constructed with terminals 15 to 22 and 15' to 22' respectively. The terminals 15 and 15' give a positive supply voltage for the remote control units and apparatus. A current which current varies according to the amount of unused tape flows between the terminals 16 and 17 (and similarily for 16' and 17'), when connected. Connection of the terminals 18 and 19, and 18' and 19' cause the recorders to record signals passed to them, but disconnection of the normally-connected terminals 19 and 20, and 19' and 20' stops recording. Once the terminals 18 and 19 or 18' and 19' have been connected recording continues until the terminals 19 and 20, or 19' and 20' respectively are disconnected. The terminals 21 and 21' are earth terminals, and an earth is intermittently connected to terminals 22 (and similarly for 22') when the recorders are ready to record, and terminals 18 and 19, or 18' and 19' have been once connected.

Since the interconnection of the apparatus is clear from the figure, operation will now be described.

The power for both recorders is switched on, and both are connected to receive the signals to be recorded. The first recorder, for example 11, is switched to record by closing a start key 29 which operates a relay A. The terminal 22 of recorder 11 then becomes intermittently earthed, and relays E and J are operated via contacts G2, J2 and K1. Operation of the relay J holds the relays E and J on via the contacts J2 and prevents relays F and K from operating when the recorder 13 is ready to record by opening contacts J1. Thus the relays E, F, J and K select which recorder is to record under the control of keys 24, 25 or 26 which may be located in different positions remote from the recorders. The recorder which records initially is determined by which of keys 29 and 29' is operated to start recording. The initial period of recording is terminated by moving one of the keys 24 to 26 or 30 to the right. A relay B operates via contacts E2, and contacts B1 disconnect terminals 19 and 20 of the recorder 11 stopping recording.

When recording is to be restarted one of the keys, 24, 25 or 26 is moved to the left. Pressing one of these keys closes its contacts until the key is released. While the connection through the key is made the relay A operates again connecting the terminals 18 and 19 via contacts A1, since the relay E has operated and contacts E1 connect the relay A to earth.

As recording continues the amount of unused tape in recorder 11 falls and the current flowing between the terminals 16 and 17 falls. A meter 27 records this fall and indicates how much tape is left. When the current flowing between terminals 16 and 17 falls to a predetermined value a comparator circuit L senses the fall and operates passing a signal to a circuit 28 which operates a relay G for an interval of about a second. Contacts G1 operate a relay C connecting the terminals 18' and 19' via contacts C1. Thus the recorder 13 is switched into operation and starts to record. If the circuit 28 were not provided, the contacts G1 would remain closed until the recorder 11 was reloaded with tape, since the relay circuit L provides a constant voltage while unused tape is below a certain limit. Thus recording could not then be started and stopped as required. Contacts G2 also operate releasing the relays E and J and keys 24 to 26 become connected to operate relays C and D. Release of the relay J closes contacts J1 and operates relays F and K, which hold on via contacts K2. The recorder 11 will now continue to run, regardless of the positions of the keys 24 to 26, until it runs out of tape.

The next time recording is stopped and started again the recorder 13 will start instead of the recorder 11. The tape on recorder 11 must now be changed and when this has been done the recorder is ready to take over from the recorder 13 when this nears the end of its tape. The process of change over from the recorder 13 to the recorder 11 is the same as already described for change over from the recorder 11 is the recorder 13, except that a comparator circuit M, a circuit 28' and a relay H sense the fall in the current flowing between terminals 16' and 17' and initiate the change over in the same way as the relay circuit L, the circuit 28 and the relay G, and the release of the relay K operates the relays E and J via contacts K1.

Keys 29 and 30 provide additional means of starting and stopping respectively, recording by the recorder 11 when ready to record, but they do not control the recorder 13. Keys 29' and 30' perform the same function for the recorder 13. These keys also provide a connection only while they are pressed.

The relays J and K may be omitted if the functions of their contacts are fulfilled by extra contacts provided on the relays E and F respectively.

Each of the recorders 11 and 13 has a further terminal (not shown) which is connected to the circuits 28 and 28' respectively. These further terminals are connected to a positive supply when the power of the recorders is switched off, and the presence of a positive voltage prevents the circuits 28 and 28' operating the relays G and H. Such an arrangement is required since if the power to the recorder under the control of the keys 24 to 26 is switched off for any reason the associated relay G or H would operate since the current between terminals 16 and 17 or 16' and 17' would fall to zero.

The recording system of the type specified is not limited to tape recorders with their own remote control units, since, for example, the remote control units of the drawing could be omitted if the relays A, B, C and D were parts of the recorders or the the remote control apparatus were connected to components having similar functions in the recorders.

As many remote keys as may be desired may, of course, be provided in parallel with the keys 24 to 26. Instead of simple keys as shown an arrangement of relays can be employed to provide an interlocking action to prevent one operator stopping recording after another has pressed a key to start recording but has not yet stopped recording.

What is claimed is:

1. Remote control apparatus for use with a tape recording system, the system including at least first and second tape recorders operatively connected to a source of recordable signals, each of said recorders being provided with start terminals for initiating a recording operation;
stop terminals for terminating a recording operation;
signal output terminals providing a signal indicative of the amount of unused tape remaining; and
intermittent earthing terminals;
the improved remote control apparatus including:
recorder energization means for connection to said start-stop terminals for initially energizing each of said recorders, said means being operable in response to recorder selection switches for energizing one of said recorders;
circuit means, including at least one recording start-stop switch, for connection to said intermittent earthing terminals and to said recorder energization means for connecting a started recorder to receive recording signals under the control of said start-stop switch; and signal sensing means for connection to said signal output terminals for operating said recorder energization means and circuit means in response to a signal indicative of a predetermined amount of recording tape remaining on a started recorder so as to transfer recording operations to another recorder.

2. A remote control apparatus according to claim 1 wherein said signal sensing means includes recorder transfer switching means for operating said recorder energization means in response to said signal so as to energize said other recorder and for switching said circuit means to said other recorder.

3. A remote control apparatus according to claim 1 including individual recorder energization means for each recorder and including individual signal sensing means for each recorder, the signal sensing means for an individual recorder being effective to operate the recorder energization means of another recorder.

4. A remote control apparatus according to claim 3 wherein each said signal sensing means includes a comparator circuit operatively connected to the signal sensing terminal of the associated recorder and responsive to a predetermined current thereat to generate an output, and
signal relay means connected to the comparator and responsive to the output thereof to close at least one set of relay contacts; and
wherein each recorder energization means includes a recorder start relay connected so as to be energized by a set of relay contacts of a signal relay means.

5. A remote control apparatus according to claim 1 wherein said circuit means includes recording control switching means for connecting the recording start-stop switch to individual recorder energization means for each recorder and wherein the signal sensing means includes an individual signaling circuit for each recorder, the signaling circuit for a recorder being effective to signal the recorder energization means for another recorder and being effective to signal the recording control switching means.

6. Remote control apparatus according to claim 5 wherein said recording control switching means includes individual relay means for each recorder, each relay means being provided with contacts for connecting said start-stop switch to the recorder energization means for the recorder associated with the individual relay means, and each relay means being provided with at least one additional contact for preventing recording by another recorder different from that associated with the relay means; and wherein the signaling circuit associated with the same recorder as a relay means is provided with a contact for de-energizing the said relay means.

7. Remote control apparatus according to claim 6 wherein the signaling circuit comprises a comparator means for momentarily operating a signal relay in response to a current indicative of a predetermined amount of unused tape at the signal terminal, the signal relay being provided with a contact in series with its recorder associated relay means and wherein the signal relay is provided with an additional contact for enabling the recorder energization means for another recorder in response to said current.

8. Remote control apparatus according to claim 6 wherein each relay means comprises a first relay for connecting said start-stop switches to the associated recorder and a second relay for preventing the energization of at least one other recorder.

9. A remote control apparatus for use in a tape recording system, the system including first and second tape recorders, each recorder being at the least provided with terminals for starting and stopping the recorder, an intermittent earthing terminal and a signal terminal providing a signal current indicative of the amount of unused tape remaining, and the system further including a source of signals to be recorded, the remote control apparatus including:

first and second recorder start-stop circuits for remote connection to the start-stop terminals respectively of said first and second recorders, each circuit being provided with a connection for a recorder initial turn-on switch;

a recording control circuit for remote connection to the intermittent earthing terminals of said recorders, said recording control circuit including at least one recording stop-start switch and selection switching means for selectively connecting said switch to said first and second recorder start-stop circuits; and first and second signal sensing circuits for remote connection to the signal terminals respectively of said first and second recorders, said first signal sensing circuit including means for enabling the start-stop circuit of said second recorder and for operating said selection switching means to connect said start-stop switch to the start-stop circuit of said second recorder, and said second signal sensing circuit including means for enabling the start-stop circuit of said first recorder and for operating said selection switching means to connect said start-stop switch to the start-stop circuit of said first recorder.

10. A remote control apparatus according to claim 9 wherein a start-stop circuit includes a start relay for initially closing a recorder start circuit; and wherein said selection switching means includes first relay means for connecting the start-stop switch to the start relay for the first recorder and second relay means for connecting the start-stop switch to the start relay for the second recorder, said first relay means including a switch for preventing recording by said second recorder and said second relay means including a switch for preventing recording by said first recorder; and wherein a signal sensing circuit includes comparator means responsive to the signal current for operating a signal relay to effect energization of a start relay and to de-energize the relay means of the recording control circuit associated with the same recorder as the sensing circuit.

11. A remote control apparatus according to claim 10 wherein each of said relay means comprises first and second paralleled relays, one of said relays being provided with contacts for connecting said start-stop switch to the associated recorder start-stop circuit and the other being provided with contacts for preventing energization of the other relay means; and wherein a signal contact of said signal relay is connected to said paralleled relays such that the operation of said signal relay effects a de-energization of said paralleled relays.

References Cited

UNITED STATES PATENTS

| | | | |
|---|---|---|---|
| 1,903,487 | 4/1933 | Snyder | 179—100.4 |
| 2,042,228 | 5/1936 | Huenlich | 274—10 |
| 2,354,739 | 8/1944 | Clausen | 179—100.4 |
| 2,359,061 | 9/1944 | Thiede | 179—100.4 |
| 2,362,803 | 11/1944 | Clausen | 179—100.4 |
| 3,295,853 | 1/1967 | Teh Yuan Cheng | 274—11 |

JOSEPH W. HARTARY, Primary Examiner

U.S. Cl. X.R.

179—100.2; 274—11